United States Patent
Kobayashi

(10) Patent No.: US 12,218,321 B2
(45) Date of Patent: Feb. 4, 2025

(54) CATALYST DEVICE FOR LEAD-ACID BATTERY, AND LEAD-ACID BATTERY

(71) Applicant: W. L. GORE & ASSOCIATES G.K., Tokyo (JP)

(72) Inventor: Kotaro Kobayashi, Tokyo (JP)

(73) Assignee: W. L. GORE & ASSOCIATES G.K., Tokyo (JP)

( * ) Notice: Subject to any disclaimer, the term of this patent is extended or adjusted under 35 U.S.C. 154(b) by 85 days.

(21) Appl. No.: 17/295,831

(22) PCT Filed: Nov. 26, 2018

(86) PCT No.: PCT/JP2018/043437
§ 371 (c)(1),
(2) Date: May 20, 2021

(87) PCT Pub. No.: WO2020/110179
PCT Pub. Date: Jun. 4, 2020

(65) Prior Publication Data
US 2022/0013819 A1    Jan. 13, 2022

(51) Int. Cl.
*H01M 10/52* (2006.01)
*H01M 10/06* (2006.01)
(Continued)

(52) U.S. Cl.
CPC .......... *H01M 10/523* (2013.01); *H01M 10/06* (2013.01); *H01M 50/392* (2021.01); *H01M 50/414* (2021.01)

(58) Field of Classification Search
CPC .............................. H01M 10/06; H01M 10/523
See application file for complete search history.

(56) References Cited

U.S. PATENT DOCUMENTS 3,536,531 A    10/1970    Sekido et al.
3,622,398 A    11/1971    Sekido et al.
(Continued)

FOREIGN PATENT DOCUMENTS

CN         1334972 A       2/2002
CN       102800831 A      11/2012
(Continued)

OTHER PUBLICATIONS

Search Report received for EP Application No. 18941382.6, mailed on Jul. 13, 2022, 14 pages.
(Continued)

*Primary Examiner* — Matthew T Martin
*Assistant Examiner* — Ankith R Sripathi

(57) ABSTRACT

Provided is a catalyst device for a lead-acid battery, the catalyst device being capable of reducing gas release from an electrolyte solution and a decrease in electrolyte solution due to the leakage, thus providing a lead-acid battery having a long life, and being capable of ensuring safety even in excessive flow of gas. Also provided is a lead-acid battery including the catalyst device. A catalyst device for a lead-acid battery, including: a catalyst layer including a catalyst to accelerate a reaction for generating water or water vapor from oxygen and hydrogen; and a porous membrane including thermoplastic resin having a melting point or a glass transition temperature of 160° C. or less, and wherein at least one surface of the catalyst layer is in contact with the porous membrane, and the porous membrane has a planar size being equal to or greater than that of the catalyst layer. Also a lead-acid battery including the catalyst device.

9 Claims, 2 Drawing Sheets

(51) Int. Cl.
*H01M 50/392* (2021.01)
*H01M 50/414* (2021.01)

(56) References Cited

U.S. PATENT DOCUMENTS

| | | | |
|---|---|---|---|
| 3,832,238 | A | 8/1974 | Marui et al. |
| 3,929,422 | A | 12/1975 | Kreidl et al. |
| 3,930,890 | A | 1/1976 | Dietz |
| 4,098,964 | A | 7/1978 | Reber |
| 4,925,746 | A | 5/1990 | Pavlov et al. |
| 5,506,067 | A | 4/1996 | Tinker |
| 6,500,576 | B1 | 12/2002 | Davis et al. |
| 2003/0113612 | A1 | 6/2003 | Jones et al. |
| 2003/0134182 | A1 | 7/2003 | Jones et al. |
| 2009/0029235 | A1 | 1/2009 | Brenner et al. |
| 2012/0079942 | A1 | 4/2012 | Hiner et al. |
| 2012/0115049 | A1* | 5/2012 | Rinzler ............... H01M 4/8673 29/829 |
| 2013/0084447 | A1* | 4/2013 | Shimatani ................ C08J 9/00 156/60 |
| 2016/0254509 | A1 | 9/2016 | Roberts et al. |
| 2019/0140326 | A1* | 5/2019 | Kobayashi ............ H01M 10/12 |

FOREIGN PATENT DOCUMENTS

| | | |
|---|---|---|
| CN | 107580731 A | 1/2018 |
| DE | 2904842 A1 | 8/1980 |
| EP | 1142050 A1 | 10/2001 |
| JP | 53-8742 A | 1/1978 |
| JP | 2017-0201594 A | 11/2017 |
| JP | 2018-506825 A | 3/2018 |
| WO | 2000036684 A1 | 6/2000 |
| WO | 2016138410 A1 | 9/2016 |
| WO | 2017191848 A1 | 11/2017 |

OTHER PUBLICATIONS

Microfilm of the specification and drawings annexed to the written application of Japanese Utility Model Application No. 000303/1976 (Laid Open No. 121726/1976) (GS Yuasa International Ltd.); Oct. 2, 1976.

* cited by examiner

CATALYST DEVICE FOR LEAD-ACID BATTERY, AND LEAD-ACID BATTERY

FIELD

The present invention relates to catalyst devices for lead-acid batteries, more preferably a catalyst device for a lead-acid battery, whereas the catalyst device prevents the decrease in electrolyte solution and enables long life, and also can ensure safety even in excessive flow of gas, and a lead-acid battery including the catalyst device.

BACKGROUND

Lead-acid batteries, in particular, automotive lead-acid batteries generally employ an open structure in which an electrolyte solution such as dilute sulfuric acid can freely flow. Lead-acid batteries having such a structure, when charged, generate oxygen and hydrogen gas and therefore comprise a vent (vent port) for discharging these gases. Otherwise, the gas pressure inside the battery would increase, which may lead to deformation and breakage of the battery.

Such leakage of gases through the vent leads to a decrease in electrolyte solution. The decrease in electrolyte solution results in an insufficient chemical reaction of battery and leads to a reduced charge capacity and discharge capacity.

In response to these problems, various efforts have hitherto been made.

PTL 1 discloses a catalyst part for a lead-acid battery, the catalyst part including a catalyst layer including a catalyst to accelerate a reaction for generating water or water vapor from oxygen and hydrogen, and an arrangement through which at least part of the water or water vapor is condensed and/or flowed back to the inside of the battery. The catalyst part can reduce gas release from an electrolyte solution and a decrease in electrolyte solution due to the leakage, thus providing a lead-acid battery having a long life.

PTL 2 discloses a catalyst device to recombine decomposed gases from electrolyte solution. This catalyst device has the ability to filter out catalytic poisons (acidic electrolyte solutions) and control the recombination temperature. More particularly, the catalyst device includes a porous section that allows gas to pass, but not liquid, to prevent catalytic poisons (e.g., acidic electrolyte solutions) from reaching the catalyst. It is described that gases that have passed through the porous section reach the catalyst site and recombine there, and can be flowed back through the porous section.

PTL 2 also discloses a catalyst device whose container can be molten due to reaction heat of a catalyst to physically cover the catalyst for shut-down of catalysis.

CITATION LIST

Patent Literature

[PTL 1] Japanese Laid-open Patent Publication No. 2017-201594
[PTL 2] U.S. Pat. No. 7,326,489B

SUMMARY

Technical Problem

As described above, common lead-acid batteries, when charged, outwardly release oxygen and hydrogen gas through a vent, leading to a decrease in electrolyte solution in the lead-acid batteries. The decrease in electrolyte solution results in an insufficient chemical reaction of battery which results in reduced charge capacity and discharge capacity. While not wishing to be bound by any particular theory, the increased con-centration of dilute sulfuric acid in an electrolyte solution may cause a positive plate to corrode to reduce the capacity, and the decreased electrolyte solution level may expose plates to rapidly reduce the discharge capacity and further corrode the joint between a negative plate and a strap.

Furthermore, the decrease in electrolyte solution may also lead to sulfation and penetration short-circuiting. Sulfation is a phenomenon where lead sulfate generated by discharge may not be sufficiently resolved into lead dioxide and lead by charge to form a bulk crystal of lead sulfate. Such a bulk crystal, which is difficult to reduce into a metal lead, reduces battery performance and shortens battery life. In addition, such a bulk crystal is involved also in penetration short-circuiting. Bulk crystals grow on an electrode into a needle crystal referred to as "dendrite". If the dendrite continues to grow, it may reach the other electrode and thereby cause a short circuit. This is penetration short-circuiting, which makes it impossible to charge and discharge the battery anymore.

Particularly in recent years, automobiles having idling stop systems for improving fuel economy have been increasingly used. Lead-acid batteries used in idling stop vehicles supply power to all the devices such as an air-conditioner and a fan during the idling stop. Thus, the lead-acid batteries tend to be undercharged and used at a low state of charge as compared with conventional starting lead-acid batteries, leading to sulfation and penetration short-circuiting. Sulfation and penetration short-circuiting can be prevented by preventing the decrease in electrolyte solution.

PTL 1 discloses a catalyst part for reducing gas release from an electrolyte solution and a decrease in electrolyte solution due to the leakage. In other words, oxygen and hydrogen gas generated from the inside of a lead-acid battery are allowed to recombine to form water or water vapor by a catalyst, and allowed to flow back to the inside of the battery. Such water or water vapor formed by recombination is present in the catalyst or in the vicinity thereof, and a problem about safety (for example, excessive gas flows to cause an excessive increase in temperature) is very unlikely caused. It, however, is useful to devise further safety measures in preparation for unexpected events.

PTL 2 discloses a catalyst device having a shut-down function. Specifically, a container of the catalyst device is molten due to heat of catalysis, to physically cover the catalyst for shut-down of catalysis. Accordingly, when the shut-down function is operated once, the catalyst is physically covered not to enable catalysis to run any longer. Furthermore, after the container was molten, the catalysts in the container may outflow into the electrolyte, which may short-circuit. In PTL 2, the shut-down function is provided on the container of the catalyst device, and furthermore the container is not adjacent to the catalyst. Therefore, a significant time is expected to be taken for transferring heat of catalysis to the container.

In addition, when the catalyst device of PTL 2 actually operates, it is necessary to control the temperature to be relatively high (approximately 70 to 90° C.) in the catalyst device of PTL 2, and the catalyst device can be used in environments where charging is carried out continuously, such as for backup, but not in environments where charging is carried out discontinuously and the temperature is uncontrollable. For example, the device of PTL 2 is not suitable for automotive lead-acid batteries, which are not necessarily used while being continuously charged and may be used in cold districts.

The catalyst device of PTL 2 employs a micro porous membrane which controls a gas flow, or can pass only small amount of gas, so as to suppress a rise of the temperature of the catalyst. Therefore, water vapor generated in the catalyst device cannot flow out efficiently, and may be easily retained in the catalyst device. Without the above-mentioned temperature control, water retained in the device may solidify under a cold atmosphere such as below zero degree centigrade, which may cause deformation or destruction, etc., of the casing of the catalyst device.

In view of the circumstances described above, it is an object of the present invention to provide a catalyst device for a lead-acid battery, the catalyst device being capable of reducing gas release from an electrolyte solution and a decrease in electrolyte solution due to the leakage, thus providing a lead-acid battery having a long life, and being capable of ensuring safety even in excessive flow of gas, and a lead-acid battery including the catalyst device.

Solution to Problem

The present invention provides the following aspects.

[1] A catalyst device for a lead-acid battery, including a catalyst layer including a catalyst to accelerate a reaction for generating water or water vapor from oxygen and hydrogen, and a porous membrane including thermoplastic resin having a melting point or a glass transition temperature of 160° C. or less, and wherein at least one surface of the catalyst layer is in contact with the porous membrane, and the porous membrane has a planar size being equal to or greater than that of the catalyst layer.

[2] The catalyst device according to Item 1, wherein the porous membrane includes polyethylene.

[3] The catalyst device according to Item 1 or 2, comprising at least two of the porous membranes, wherein the porous membranes are laminated in contact with the both planes of the catalyst layer, and optionally the peripheral parts of the porous membranes are laminated to each other.

[4] The catalyst device according to any one of Items 1 to 3, further including an expanded porous polytetrafluoroethylene membrane having a Gurley number of 100 seconds or more, and being in contact with the porous membrane on the side opposite to the catalyst layer.

[5] The catalyst device according to any one of Items 1 to 4, further including at least one of porous membrane capable of absorbing or decomposing a catalytic poison.

[6] The catalyst device according to Item 5, wherein the porous membrane capable of absorbing or decomposing the catalytic poison includes a substance capable of absorbing or decomposing the catalytic poison inside the porous membrane capable of absorbing or decomposing the catalytic poison.

[7] The catalyst device according to Item 5 or 6, wherein the porous membrane capable of absorbing or decomposing the catalytic poison includes expanded polytetrafluoroethylene.

[8] The catalyst device according to any one of Items 1 to 7, further including a hydrophobic porous membrane located closer to the inside of the lead-acid battery than the catalyst layer is, wherein the hydrophobic porous membrane has a Gurley number of 20 seconds or less.

[9] The catalyst device according to Item 8, wherein the hydrophobic porous membrane includes expanded polytetrafluoroethylene.

[10] A lead-acid battery including the catalyst device according to any one of Items 1 to 9.

Advantageous Effects of Invention

The present invention provides a catalyst device for a lead-acid battery, the catalyst device being capable of reducing gas release from an electrolyte solution and a decrease in electrolyte solution due to the leakage, thus providing a lead-acid battery having a long life, and being capable of ensuring safety even in excessive flow of gas, and a lead-acid battery including the catalyst device.

DESCRIPTION OF EMBODIMENTS

The catalyst device for a lead-acid battery provided by the present invention includes a catalyst layer including a catalyst to accelerate a reaction for generating water or water vapor from oxygen and hydrogen, and a porous membrane including thermoplastic resin having a melting point or a glass transition temperature of 160° C. or less, wherein at least one surface of the catalyst layer is in contact with the porous membrane, and the porous membrane has a planar size being equal to or greater than that of the catalyst layer.

Figure 1:
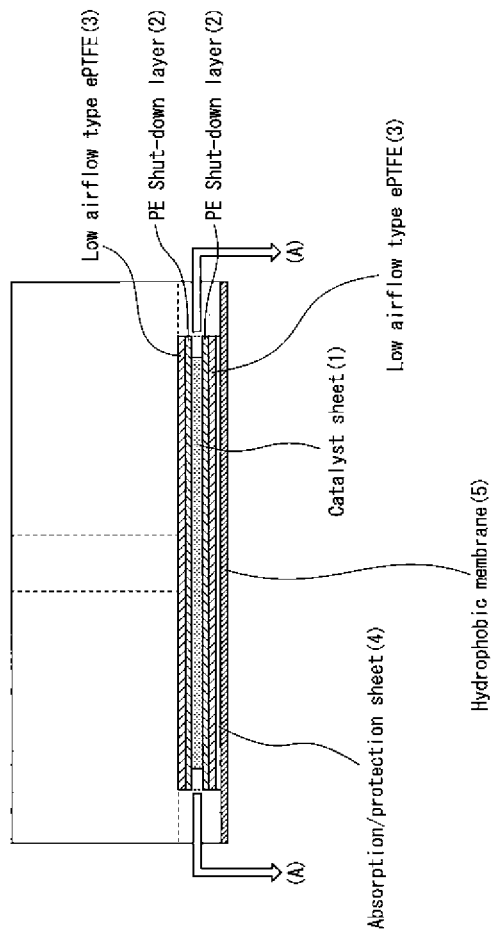
FIG. 1 is a schematic diagram according to one aspect of the present invention.

FIG. 1 is a diagram schematically illustrating a catalyst device according to one aspect of the present invention. One aspect of the present invention will be described with reference to FIG. 1. FIG. 1 illustrates a schematic cross-sectional diagram of the catalyst device for a lead-acid battery. The underside of the figure is the inside of the battery, and the upside of the figure is the outside of the battery. There is an electrolyte solution (not illustrated) on the underside of the catalyst device (the inside of the battery). Since the electrolyte solution in a lead-acid battery is an aqueous dilute sulfuric acid solution, the electrolyte solution (aqueous dilute sulfuric acid solution), sulfuric acid mist, moisture, and hydrogen gas and oxygen gas generated by a battery reaction are present in the internal space of the battery.

When hydrogen gas and oxygen gas flow in a catalyst layer (1), which includes a catalyst to accelerate a reaction for generating water or water vapor from oxygen and hydrogen, the reaction for generating water or water vapor proceeds in the catalyst layer (1). Hydrogen gas and oxygen gas generated by a battery reaction recombine in the catalyst layer (1) to form water or water vapor, and the water or water vapor is, in some cases, condensed and/or flowed back to the inside of the battery, which results in a reduced decrease in electrolyte solution inside the battery.

The water generated in the catalyst layer (1) can be released in the form of liquid as well as in the form of water vapor. This is particularly advantageous when a battery is repeatedly put into and out of operation, such as in the case of an automotive battery. The reason is that when a battery in operation is put out of operation, the temperature of the battery decreases, and water or water vapor generated until then is readily condensed into a liquid. Since a liquid as well as vapor of water can be released from the catalyst layer (1), water may not remain in the catalyst layer (1). Accordingly, even when the atmosphere temperature is as low as below zero degree centigrade, water is prevented from solidification in the catalyst layer (1), which may cause destruction, etc., of the casing of the catalyst layer (1). In other words, the use of the catalyst device of the present invention eliminates the need for temperature control for forming water vapor as in PTL 2.

The catalyst device of the present invention includes, in addition to the catalyst layer (1), a porous membrane including thermoplastic resin having a melting point or a glass transition temperature of 160° C. or less. In addition, at least one surface of the catalyst layer is in contact with the porous membrane. Furthermore, the porous membrane has a planar size being equal to or greater than that of the catalyst layer.

The porous membrane is illustrated as a porous membrane (2) in FIG. 1. Hydrogen gas and oxygen gas generated by a battery reaction react with each other in the catalyst layer (1). This reaction is an exothermic reaction. When excessive amounts of hydrogen gas and oxygen gas flow in the catalyst layer (1) by an unexpected event, the reaction in the catalyst layer (1) may excessively proceed, thereby causing an excessive increase in the temperature of the catalyst layer (1) and the vicinity thereof. In general, an increase in temperature may result in an enhancement in catalyst activity and thus cause a further increase in reaction speed, leading to thermal runaway and ignition. In the present invention, at least one surface of the catalyst layer (1) is in contact with the porous membrane (2), and the porous membrane (2) includes thermoplastic resin having a melting point or a glass transition temperature of 160° C. or less. The catalyst layer (1) is in contact with the porous membrane (2), thereby allowing heat of catalysis to be readily transferred to the porous membrane (2). The porous membrane (2) is thus changed in volume by melting or glass transition at a temperature of 160° C. or less. Therefore, the size of pores in the porous membrane (2) is further reduced or such pores are closed, so that gas is rapidly allowed to hardly pass through the porous membrane (2) and gas in contact therewith is allowed to hardly flow in the catalyst layer (1), thereby suppressing catalysis. Thus, heat of catalysis is rapidly reduced, and an increase in the temperature of the catalyst layer (1) and the vicinity thereof is suppressed.

The melting point or the glass transition temperature of the thermoplastic resin can be appropriately selected depending on the amount of gas generated, catalytic performances, and the like. The melting point may be from 100° C. to 180° C., and the glass transition temperature may be from 60° C. to 160° C.

The thermoplastic resin may be polyethylene, polypropylene, polyvinyl chloride, polymethyl methacrylate, polystyrene, or polyvinylidene fluoride. Table 1 represents the melting point and the glass transition temperature of each of such thermoplastic resins.

TABLE 1

Melting point and glass transition temperature of each thermoplastic resin

| Thermoplastic resin | Glass transition temperature (° C.) | Melting point (° C.) |
|---|---|---|
| Polyethylene (PE) | — | 130 |
| Polypropylene (PP) | — | 160 |
| Polyvinyl chloride (PVC) | 60 | 100 |
| Polymethyl methacrylate (PMMA) | 80 | 115 |
| Polystyrene (PS) | 100 | — |
| Polyvinylidene fluoride (pvdf) | 160 | 180 |

While PTL 2 discloses a shut-down function, the function is provided on a container of the catalyst device, and furthermore the container is not adjacent to a catalyst. Therefore, a significant time is expected to be taken for transferring heat of catalysis to the container. In other words, catalysis is not able to be rapidly suppressed. In PTL 2, the container of the catalyst device is molten due to heat of catalysis, to physically cover the catalyst for shut-down of catalysis. Accordingly, when the shut-down function is operated once, the catalyst is physically covered, not to enable the catalyst reaction to run any longer. Furthermore, after the container was molten, the catalysts in the container may outflow into the electrolyte, which may short-circuit. In the present invention, first, pores in the porous membrane (2) are further decreased in the size or the pores are closed to thereby allow the flow rate of gas to be reduced. In other words, the present invention is not aimed at covering a catalyst by itself. Accordingly, catalysis can be subsequently continued, thus providing a battery having a long life.

The porous membrane (2) in the present invention has a planar size being equal to or greater than that of the catalyst layer (1). The function effect is described.

The porous membrane (2) may be shrunk due to the change in the volume of the porous membrane (2) by melting or glass transition. When the porous membrane (2) is shrunk and thus is in less contact with the catalyst layer (1), which creates a portion of the catalyst layer (1) not covered with the porous membrane (2) and a remaining flow path to the catalyst layer (1). In this case, not all the reaction in the catalyst layer (1) is suppressed, thereby causing an increase in the temperature of the catalyst layer (1) and the vicinity thereof. The porous membrane (2) in the present invention, however, has a planar size being equal to or greater than that of the catalyst layer (1), and therefore can cover the catalyst layer (1) and may not allow any gas to readily flow in the catalyst layer (1) even after heat shrinkage. Therefore, such an increase in the temperature of the catalyst layer (1) and the vicinity thereof can be suppressed at a higher rate.

Furthermore, in the present invention, a surface of the catalyst layer (1) is in contact with the porous membrane (2). Therefore, when heat shrinkage of the porous membrane (2) is attempted, friction resistance is generated on the contact surface of the catalyst layer (1), thereby suppressing heat shrinkage of the porous membrane (2). In addition, the porous membrane (2) has a planar size being equal to or greater than that of the catalyst layer (1). Accordingly, any gas cannot reach the catalyst layer (1), without passing the porous membrane (2). In order to increase friction resistance, a load may be applied in the lamination thickness direction of the catalyst layer (1) and the porous membrane (2), or the catalyst layer (1) and the porous membrane (2) may be pressure-bonded in the lamination thickness direction.

In one aspect of the present invention, the porous membrane (2) may be laminated in contact with both planes of the catalyst layer (1), or the peripheral parts of the porous membrane (2) may be optionally laminated to each other.

As illustrated in FIG. 1, two of the porous membranes (2) may be laminated in contact with both planes of the catalyst layer (1), i.e., the upper plane and the lower plane. Alternatively, one of the porous membrane may be wrapped around the catalyst layer (1), so as to form an envelope to cover both sides of the catalyst layer (1). The porous membrane (2) is laminated on the upper plane and the lower plane of the catalyst layer, thereby increasing resistance to gas flow. Therefore, gas hardly flows in the catalyst layer (1) and catalysis is suppressed, so that an increase in the temperature of the catalyst layer (1) and the vicinity thereof can be reduced at a higher rate.

Furthermore, the porous membrane (2) has a planar size being equal to or greater than that of the catalyst layer (1), and therefore the upper and lower peripheral parts of the porous membrane (2) may be laminated to each other. Not only the upper plane and the lower plane of the catalyst layer (1), but also the lateral sides thereof may be surrounded by the porous membrane (2). It can be prevented to cause gas to directly flow in the lateral sides of the catalyst layer (1) without passing through the porous membrane (2). Preferably, the lateral sides of the catalyst layer (1) may be in contact with the porous membrane (2). When the catalyst layer (1) is in contact with the porous membrane (2), heat of catalysis can be readily transferred to the porous membrane (2), thereby rapidly allowing pores of the porous membrane (2) to be further reduced in the size or closed.

In one aspect of the present invention, the catalyst device may further include an expanded porous polytetrafluoroethylene membrane (porous ePTFE membrane) (3) having a Gurley number of 100 seconds or more, and being in contact with the porous membrane at the side opposite to the catalyst layer.

The Gurley value is evaluated based on JIS P 8117:1998. The Gurley value refers to a time (second(s)) for which 100 $cm^3$ of air vertically passes through a sample having an area of 6.45 $cm^2$ at a pressure of 1.29 kPa. The Gurley value is an index of air permeability. Even when the porous membrane (2) is broken by heat shrinkage or the like, the porous ePTFE membrane (3) can inhibit gas from excessively flowing in the catalyst layer (1). When the porous membrane (2) is molten or subjected to glass transition, the porous membrane (2) molten or the like allows pores in the porous ePTFE membrane (3) to be reduced in the size or closed. Thus, the porous ePTFE membrane (3) is decreased in air permeability, allowing gas to hardly flow in the catalyst layer (1), and more certainly suppressing catalysis. The Gurley value of the porous ePTFE membrane (3) may be appropriately adjusted depending on the catalyst activity of the catalyst layer (1), the amount predicted of gas generated, and the like. A Gurley value of 100 seconds or more can sufficiently reduce the amount of gas flowing in the catalyst layer (1). The porous ePTFE membrane (3) may be provided on only any one or both of the upper and the lower sides of the catalyst layer (1).

In one aspect of the present invention, the catalyst device may further include at least one porous membrane capable of absorbing or decomposing catalytic poison (4).

One example of the catalytic poison is dilute sulfuric acid in an electrolyte solution, or sulfide which is generated from dilute sulfuric acid, such as $H_2S$. The catalytic poison, when coming into contact with a catalyst, reduces its catalytic performance. The substance capable of absorbing or decomposing a catalytic poison may be activated carbon, ZnO, potassium carbonate, or the like, and such materials can absorb or decompose a catalytic poison. Thus, when the catalyst device includes the at least one porous membrane capable of absorbing or decomposing a catalytic poison (4), the decrease in catalytic performance can be suppressed.

Preferably, the substance capable of absorbing or decomposing a catalytic poison may be included inside the at least one porous membrane capable of absorbing or decomposing a catalytic poison (4). The phrase "inside the porous membrane (4)" means that the substance capable of absorbing or decomposing a catalytic poison may be present or arranged in the inside cavities or on the surface of the pores of the porous membrane (4). In this case, the substance capable of absorbing or decomposing a catalytic poison is exposed in the cavities or on the surface of the porous membrane (4) and readily comes into contact with a catalytic poison, facilitating the absorption or de-composition of the catalytic poison.

In the at least one porous membrane capable of absorbing or decomposing a catalytic poison (4), for example, polypropylene and expanded polytetrafluoroethylene (ePTFE) can be used, and woven fabrics, nonwoven fabrics, knitted fabrics, and porous membranes thereof may also be used. Preferably, the porous membrane (4) may include porous ePTFE. Since ePTFE has by nature hydrophobicity, the porous membrane (4) is capable of passing or shedding (repelling) the water or water vapor generated in the catalyst layer (1) to facilitate the flowing back of the water or water vapor to the electrolyte solution inside the battery. The porous membrane (4) including ePTFE or the like can be subjected to a hydrophilization treatment. In the hydrophilization treatment, a metal oxide gel may be used. Specifically, a sol of a hydrophilic metal oxide is provided, and a porous member is immersed in the sol, which gelates afterward. In this manner, the inner surface of pores of the porous member can be modified by the hydrophilic oxide gel. For example, based on the sol-gel process, the surface of the member may be coated with a silica material for hydrophilization. Such hydrophilization can be conducted by a surface treatment with plasma or the like. The porous membrane (4) can be subjected to hydrophilization, thereby allowing wettability to a catalytic poison to be enhanced. Thus, a catalytic poison can be absorbed or decomposed more certainly. The degree of hydrophilization treatment can be appropriately set in comparative consideration of the action of flowback of moisture generated in the catalyst and the action of absorbability of a catalytic poison.

The at least one of porous membrane capable of absorbing or decomposing a catalytic poison (4) may be produced by mixing a substance capable of absorbing or decomposing a catalytic poison and polytetrafluoroethylene and then making porous the mixture thereof or making porous the mixture thereof through expansion. Through the expansion of a substance capable of absorbing or decomposing a catalytic poison and polytetrafluoroethylene mixed in advance, microcavities defined by nodes and/or fibrils are formed in polytetrafluoroethylene, in which microcavities the substance capable of absorbing or decomposing a catalytic poison is held.

In one aspect of the present invention, the catalyst device further includes a hydrophobic porous membrane (5) located closer to the inside of the lead-acid battery than the catalyst layer (1). The hydrophobic porous membrane (5) may employ a porous membrane having high gas permeability, such that water vapor may not be retained. A Gurley number of 20 seconds or less results in highly gas permeability.

Therefore, the hydrophobic porous membrane (5) does not inhibit hydrogen gas and oxygen gas from flowing in the catalyst layer (1). Furthermore, water vapor generated in the catalyst layer (1) easily flow back to the inside of the lead-acid battery, and may not be retained in the catalyst device. Furthermore, the hydrophobic porous membrane (5), which is hydrophobic (water-repelling), is capable of preventing sulfuric acid mist and an electrolyte solution (an aqueous dilute sulfuric acid solution) from coming into direct contact with the catalyst of the catalyst layer (1) to increase the life of the catalyst. The hydrophobic porous membrane (5) is preferably unreactive with other materials inside the battery, such as salts of sulfuric acid. For example, polypropylene and PTFE can be used, and woven fabrics, nonwoven fabrics, knitted fabrics, and porous membranes thereof may also be used. The hydrophobic porous membrane (5), similarly to the porous ePTFE membrane (3) and the at least one of porous membrane capable of absorbing or decomposing a catalytic poison (4), may be porous polytetrafluoroethylene. Polytetrafluoroethylene, which has excellent properties such as hydrophobicity, chemical resistance, UV resistance, oxidation resistance, and heat resistance, is suitable as a constituent material of a battery. Alternatively, for example, expanding polytetrafluoroethylene can readily provide a porous member.

At least part of the water or water vapor generated by catalysis can be flowed back to the inside of the lead-acid battery through the catalyst layer (1) and the porous member (2), and optionally the porous ePTFE membrane (3), the at least one of porous membrane capable of absorbing or decomposing a catalytic poison (4) and/or the hydrophobic porous membrane (5).

In one aspect of the present invention, the catalyst device may include a space in which at least part of the water or water vapor generated is able to be condensed, and may also include a path through which the water or water vapor generated by the catalysis and the water condensed in the space can be flowed back to the inside of the battery. It is noted that at least part or all of the space can be referred to as the path and at least part or all of the path can be referred to as the space. (A) in FIG. 1 represents one example of the arrangement, i.e., one example of the space where at least part of the water or water vapor generated is able to be condensed and the path through which the water or water vapor generated by the catalysis and the water condensed in the space can be flowed back to the inside of the battery.

Furthermore, the catalyst device of the present invention may be gas permeable as a whole. The gas permeability can be obtained by adjusting the porosity or the filling ratio of the catalyst in the catalyst layer, or the air permeability of the porous membrane, etc. Thereby, when the pressure inside of the battery exceeds a certain value, the gas can be discharged out of the battery to reduce the pressure inside the battery. A certain value of the pressure may be selected in view of the pressure resistance of the material of the casing of the battery, or in view of the gas permeability of a part except for the catalyst device, for example, safety valve, etc. As the result, the catalyst device being gas permeable as a whole, can improve the explosion-proofness of the battery, to avoid fatal damage to the battery and helps improve safety.

In one aspect of the present invention, the catalyst device of the present invention may include essential constituent elements and optional constituent elements accommodated in a catalyst device casing or a spacer. The catalyst device casing or the spacer may be formed so as to define the form of the catalyst device and facilitate the arrangement of each constituent element and the attachment thereof to a lead-acid battery. The catalyst device casing or the spacer may also be formed so as to include a space where at least part of the water or water vapor generated is able to be condensed. The catalyst device casing or the spacer may be formed from a porous member, a membranous member, or the like.

Examples of the casing or the spacer include casings or spacers made of resin materials, such as polypropylene (PP). Examples of the porous member include sintered porous members of resin materials, such as polypropylene (PP), and expanded porous polytetrafluoroethylene. Examples of the membranous member include woven fabrics, nonwoven fabrics, knitted fabrics, and porous membranes made of resin materials, such as polypropylene (PP) and PTFE. The dimensions of the casing or the spacer and the constituent elements accommodated can be appropriately adjusted, thereby applying a proper load to the porous membrane (2) to reduce deformation such as heat shrinkage.

In another aspect of the present invention, a lead-acid battery including the catalyst device described above is provided. The lead-acid battery including the catalyst device can allow gas release from an electrolyte solution and a decrease in electrolyte solution due to the leakage to be reduced, thus providing a lead-acid battery having a long life, and can allow safety to be ensured even in excessive flow of gas.

The lead-acid battery may include cells. In this case, each of the cells may be provided with a catalyst device of the present invention. When there are cells, catalytically generated water or water vapor derived from an electrolyte solution in a cell can move to other cells. In this case, the amount of electrolyte solution can differ from cell to cell. At least one catalyst device in each cell may help hydrogen gas and oxygen gas generated in each cell to recombine in the catalyst layer (1) in each cell and help the water or water vapor generated to flow back to the cell (the cell from which the water or water vapor is derived). This is useful for avoiding the difference in the amount of electrolyte solution from cell to cell.

In one aspect of the present invention, the catalyst layer (1) may include a hydrophobic porous member. In the catalyst layer (1), hydrogen gas and oxygen gas generated by a battery reaction recombine to form water or water vapor, and the catalyst layer (1) tends to be humid. When a catalyst is covered by water or water vapor, hydrogen gas and oxygen gas are less likely to come into contact with the catalyst, and the catalyst reaction (recombination reaction) tends to be less efficient. The hydrophobic porous member in the catalyst layer (1) facilitates the release of the water or water vapor generated out of the catalyst layer (1) to prevent a decrease in efficiency of the catalyst reaction (recombination reaction). The hydrophobic porous member also facilitates the flowing back of the water or water vapor generated to the electrolyte solution inside the battery.

Figure 2:
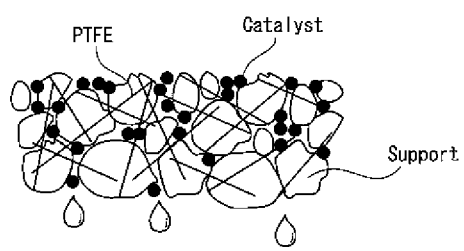
FIG. 2 is a conceptual diagram illustrating a catalyst support arranged in the cavities or on the surface of the pores of a hydrophobic porous member.

Preferably, in the catalyst layer (1), a catalyst support supporting a catalyst may be arranged in the cavities or on the surface of the pores of the catalyst layer (1) (or hydrophobic porous member) (see FIG. 2). In this case, the catalyst support, in particular, the catalyst is exposed in the cavities of the catalyst layer (1) and readily comes into contact with hydrogen gas and oxygen gas, facilitating the reaction to generate water. When the catalyst layer (1) includes a hydrophobic porous member, water generated is readily released by the hydrophobic porous member in the vicinity, increasing the life of the catalyst. The hydrophobic porous member also facilitates the flowing back of the water or water vapor generated to the electrolyte solution inside the battery.

The catalyst layer (1) may be in other forms than the above, and the catalyst support may be in the form of powder, molded powder, or pelletized powder.

The catalyst layer (1) (or hydrophobic porous member) is preferably unreactive with other materials inside the battery, such as salts of sulfuric acid. For example, polypropylene and PTFE can be used, and woven fabrics, nonwoven fabrics, knitted fabrics, and porous membranes thereof may also be used. The catalyst layer (1) (or hydrophobic porous member) may be porous polytetrafluoroethylene (PTFE). Polytetrafluoroethylene, which by nature has excellent properties such as hydrophobicity, chemical resistance, UV resistance, oxidation resistance, and heat resistance, is suitable as a constituent material of a battery. Making porous can be achieved using a blowing agent. Alternatively, for example, expanding polytetrafluoroethylene can readily provide a porous member. More particularly, expanded porous polytetrafluoroethylene is composed of nodes (knots) and fibrils (small fibers). A catalyst or a catalyst support is held in microcavities (micropores) defined by the nodes and/or the fibrils. The nodes and the fibrils are both made of polytetrafluoroethylene, and the difference between them is thought to be due to the difference in the state of aggregation or crystallization of polytetrafluoroethylene molecules. Generally, it is believed that a node is an aggregate of polytetrafluoroethylene primary particles, whereas a fibril is made of a bundle of crystal ribbons expanding from the node, i.e., the primary particles.

The catalyst layer (1) (or hydrophobic porous member) may be produced by mixing a catalyst support and polytetrafluoroethylene and then making porous the mixture thereof through expansion. Through the expansion of a catalyst support and polytetrafluoroethylene mixed in advance, microcavities defined by nodes and/or fibrils are formed in polytetrafluoroethylene, in which microcavities the catalyst support is held.

Alternatively, an expanded porous PTFE fiber containing a catalyst support and/or a catalyst itself may be produced by mixing polytetrafluoroethylene with the catalyst support and/or the catalyst itself and expanding the mixture. Woven fabrics and felts produced using the fiber may be used as the catalyst layer (1).

The catalyst layer (1) may include a catalyst support supporting a catalyst metal. The catalyst metal may be any catalyst for recombining hydrogen and oxygen to form water, and examples include Pd, Pt, and Au. The support supporting a catalyst may be any support having a specific surface area sufficient to support the catalyst in a desired dispersed state. The support can be selected from the group consisting of silica, alumina, zeolite, carbon, oxides and carbides of Group IVB, VB, VIB, VIIB, and VIII transition metals, and combinations thereof. Alternatively, the support may be a carbon material. It is not preferred that a supporting material effect a chemical reaction other than the desired reaction or substances constituting the supporting material be eluted upon contact with condensed water. In this regard, carbon materials are chemically stable and preferred supporting materials. Examples of carbon materials include carbon black (e.g., oil furnace black, channel black, lamp black, thermal black, and acetylene black), activated carbon, coke, natural graphite, and artificial graphite. These may be used in combination.

EXAMPLES

The present invention will now be described in more detail with reference to examples and comparative examples. The following examples, however, are not construed as limiting the present invention.

Example 1

The catalyst layer (1) was provided as follows. A 5% by weight Pd catalyst/activated carbon-supported catalyst was provided, and the catalyst was mixed with an alumina filler (filling ratio: 70% by weight) and sintered, thereby providing the catalyst layer (1). Two porous membranes of polyethylene (melting point: 130° C.), having a planar size greater than that of the catalyst layer (1), were provided as the porous membranes (2). A catalyst device casing provided with a depressed portion was provided so as to be able to accommodate a surface of the catalyst layer (1) and the porous membranes (2). The catalyst layer (1) was sandwiched by the porous membranes (2) so that surfaces of the catalyst layer (1) were in contact with the surfaces of each of the porous membranes (2), and accommodated in the depressed portion of the catalyst device casing. The catalyst device obtained was attached to a chamber provided in order to simulate a lead-acid battery. An electrolyte solution was not used. Instead, hydrogen gas and oxygen gas were fed to the catalyst device. Oxygen and hydrogen were fed at a ratio of 1:2 according to a stoichiometric ratio. Hydrogen was fed at a flow rate ranging from 57 ml/min (corresponding to 5 A) to 226 ml/min (corresponding to 20 A). In the present Example 1, even when hydrogen was continued to flow at 226 ml/min (corresponding to 20 A) for 5 minutes or more, the temperature of the catalyst layer (1) was at most about 100° C. Therefore, the porous membranes (2) were not molten, and a catalyst reaction was continued, thereby enabling oxygen and hydrogen to recombine to form water.

Furthermore, we reproduced the above experiments with using two porous membranes (2)' of polyethylene having a planar size being equal to that of the catalyst layer (1), instead of porous membranes (2). Consequently, the experimental results with porous membranes (2)' were the same as that with porous membranes (2).

A catalyst device where only the catalyst layer (1) was accommodated in a catalyst device casing was provided as Comparative Example. In other words, the catalyst device was not provided with the porous membrane (2). When hydrogen and oxygen were fed to the catalyst device, the temperature of the catalyst layer (1) exceeded 150° C. after 57 ml/min (corresponding to 5 A) of hydrogen was fed for 10 minutes. Such a temperature exceeded the melting point of polyethylene as the material of the porous membrane (2).

The catalyst layer (1) and the porous membranes (2) were accommodated in the depressed portion of the catalyst device casing so that surfaces of the catalyst layer (1) were not in contact with the surfaces of each of the porous membranes (2), as another Comparative Example. The lamination order of the catalyst layer (1) and the porous membranes (2) were the same as in Example 1. Therefore, a space existed between the catalyst layer (1) and the porous membranes (2). When hydrogen and oxygen were fed to the catalyst device, the temperature of the catalyst layer (1) exceeded 150° C. and the porous membranes (2) were molten after 170 ml/min (corresponding to 15 A) of hydrogen was fed. As reason it was considered that the porous membranes (2) were not contact with the catalyst layer (1), and thus friction resistance did not work therebetween. Accordingly, the porous membranes (2) thermally shrank to cause oxygen and hydrogen to reach the catalyst layer (1)

without passing the porous membranes (2), thereby facilitating a catalyst reaction to result in an increase in temperature.

Example 2

The catalyst device provided in Example 1 was used to confirm what degree of water generated due to recombination by the catalyst reaction was flowed back. Hydrogen and oxygen were fed to the catalyst device attached to a chamber at respective rates of 2.7 ml/min and 1.8 ml/min at 60° C.

The flowback performance of a catalyst part was defined by the amount (%) of water collected in the chamber after testing, based on the amount of water or water vapor that could be formed when all the oxygen and hydrogen fed were reacted and recombined.

In Example 2, the flowback performance was 70%. In other words, the amount of water collected in the chamber was 70%. The amount of water remaining in the catalyst device was 0%.

In a product based on PTL 2 as Reference Example, the flowback performance under the same conditions as in Example 2 was 50%. Herein, 4% of the flowback performance was due to water remaining in the product.

After completion of the above testing, the catalyst device was stored in an environment of a temperature of 30° C., and was again tested in the same manner as described above. In the catalyst device of the present invention, no decrease in flowback performance was confirmed. In the product based on PTL 2 as Reference Example, the flowback performance was decreased to about 20% of the value before the storage. The reason was considered because it was preferable to control the temperature to be relatively high temperature (approximately 70 to 90° C.) in the product in Reference Example.

Example 3

Two expanded porous polytetrafluoroethylene membranes (3) having a Gurley number of 100 seconds or more, and being in contact with the porous membranes (2) on the side opposite to the catalyst layer (1) were further accommodated in the catalyst device provided in Example 1. Hydrogen and oxygen were fed under the same conditions as in Example 1. The results obtained in the catalyst device of Example 3 were almost the same as those of Example 1. In other words, even when 226 ml/min (corresponding to 20 A) of hydrogen was continued to flow for 5 minutes or more, the temperature of the catalyst layer (1) was at most about 100° C. Therefore, the porous membranes (2) were not molten, and a catalyst reaction was continued, thereby enabling oxygen and hydrogen to recombine to form water. Furthermore, when the amount of hydrogen fed to the catalyst device of Example 1 was increased to 283 ml/min (corresponding to 25 A), an increase in temperature by several degrees was observed. When the amount of hydrogen fed to the catalyst device of Example 3 was increased to 283 ml/min (corresponding to 25 A), almost no increase in temperature was observed. It was confirmed that the effect of decreasing an increase in temperature was further highly exerted in Example 3 where the expanded porous polytetrafluoroethylene membranes (3) were added.

Example 4

In Examples 1 to 3, polyethylene was used as the material of the porous membrane (2). Not only such a porous membrane, but also a porous membrane made of polyethylene, polypropylene, polyvinyl chloride, polymethyl methacrylate, polystyrene, or polyvinylidene fluoride as the material was provided. The Gurley value of each of these porous membranes was measured at room temperature. Thereafter, these porous membranes were stored at temperatures higher than the melting points/glass transition temperatures of the respective materials, and the Gurley numbers thereof were again measured. All the porous membranes were increased in the Gurley numbers about twice the values measured at room temperature. It was confirmed from the results that a porous membrane made of a material other than polyethylene was also able to be utilized as the porous membrane (2) in the present invention.

The invention claimed is:

1. A catalyst device for a lead-acid battery, comprising:
a catalyst layer comprising a catalyst to accelerate a reaction for generating water or water vapor from oxygen and hydrogen; and
a porous membrane defining a plurality of pores; and the porous membrane comprising thermoplastic resin having a melting point or a glass transition temperature of 160° C. or less, and
wherein at least one surface of the catalyst layer is in contact with the porous membrane, and
the porous membrane has a planar size being equal to or greater than that of the catalyst layer, and
the catalyst device further comprising an expanded porous polytetrafluoroethylene membrane having a Gurley number of 100 seconds or more, and being in contact with the porous membrane on the side opposite to the catalyst layer, wherein the porous membrane is between the expanded porous polytetrafluoroethylene membrane and the catalyst layer;
wherein the catalyst layer, porous membrane and expanded polytetrafluoroethylene membrane are stacked in order from the inside of the battery of (1) the expanded porous PTFE membrane, (2) the porous membrane, (3) the catalyst layer.

2. The catalyst device according to claim 1, comprising at least two of the porous membranes, wherein the porous membranes are laminated in contact with at least two surfaces of the catalyst layer, and optionally the peripheral parts of the porous membranes are laminated to each other.

3. The catalyst device according to claim 1, further comprising at least one of porous membrane capable of absorbing or decomposing a catalytic poison.

4. The catalyst device according to claim 3, wherein the porous membrane capable of absorbing or decomposing the catalytic poison comprises a substance capable of absorbing or decomposing the catalytic poison inside the porous membrane capable of absorbing or decomposing the catalytic poison.

5. The catalyst device according to claim 3, wherein the porous membrane capable of absorbing or decomposing the catalytic poison comprises expanded polytetrafluoroethylene.

6. The catalyst device according to claim 1, further comprising a hydrophobic porous membrane located closer to the inside of the lead-acid battery than the catalyst layer is, wherein the hydrophobic porous membrane has a Gurley number of 20 seconds or less.

7. The catalyst device according to claim 6, wherein the hydrophobic porous membrane comprises expanded polytetrafluoroethylene.

8. A lead-acid battery comprising the catalyst device according to claim 1.

9. The catalyst device according to claim 1, wherein the porous membrane is configured to reduce the size of the pores in the porous membrane, or close the pores in the porous membrane, when the temperature increases above the melting point or glass transition temperature.

* * * * *